US008180796B1

United States Patent
Mah et al.

(10) Patent No.: US 8,180,796 B1
(45) Date of Patent: May 15, 2012

(54) SUPPLIER INTEGRATION WITH SERVICES BUSINESS LANGUAGE

(75) Inventors: Anson Mah, San Francisco, CA (US); Patrick Garvey, San Francisco, CA (US); Satnam Alag, Santa Clara, CA (US)

(73) Assignee: Rearden Commerce, Inc., San Mateo, CA (US)

( * ) Notice: Subject to any disclaimer, the term of this patent is extended or adjusted under 35 U.S.C. 154(b) by 902 days.

(21) Appl. No.: 11/093,610

(22) Filed: Mar. 29, 2005

(51) Int. Cl.
  *G06F 7/00* (2006.01)
  *G06Q 30/00* (2012.01)
(52) U.S. Cl. .................................. 707/790; 705/26.1
(58) Field of Classification Search ................. None
  See application file for complete search history.

(56) References Cited

U.S. PATENT DOCUMENTS

| | | | |
|---|---|---|---|
| 5,966,068 A | 10/1999 | Wicks et al. | |
| 6,304,850 B1 | 10/2001 | Keller et al. | |
| 6,338,081 B1 | 1/2002 | Furusawa et al. | |
| 6,885,998 B1 | 4/2005 | Arduino | |
| 7,127,677 B2 | 10/2006 | Chou | |
| 7,401,025 B1 | 7/2008 | Lokitz | |
| 7,734,486 B2 | 6/2010 | Mortimore, Jr. et al. | |
| 7,739,134 B2 | 6/2010 | Mortimore, Jr. et al. | |
| 7,742,954 B1 | 6/2010 | Handel | |
| 7,962,381 B2 | 6/2011 | Handel et al. | |
| 2002/0010664 A1 | 1/2002 | Rabideau et al. | |
| 2002/0016729 A1 | 2/2002 | Breitenbach et al. | |
| 2002/0019786 A1 | 2/2002 | Gonzalez et al. | |
| 2002/0032591 A1 | 3/2002 | Mahaffy et al. | |
| 2002/0040352 A1 | 4/2002 | McCormick | |
| 2002/0072937 A1 | 6/2002 | Domenick et al. | |
| 2002/0087366 A1 | 7/2002 | Collier et al. | |
| 2002/0152100 A1 | 10/2002 | Chen et al. | |
| 2003/0023463 A1* | 1/2003 | Dombroski et al. | 705/5 |
| 2003/0036930 A1 | 2/2003 | Matos et al. | |
| 2003/0053611 A1 | 3/2003 | Lee | |
| 2003/0187710 A1 | 10/2003 | Baumer et al. | |
| 2004/0106399 A1 | 6/2004 | Ki | |
| 2004/0161097 A1* | 8/2004 | Henry | 379/266.02 |
| 2004/0193457 A1* | 9/2004 | Shogren | 705/5 |

(Continued)

OTHER PUBLICATIONS

"The Talaris Services Business Language: A Case Study on Developing XML Vocabularies Using the Universal Business Language" by Calvin Smith, Patrick Garvey, and Robert Glushko; School of Information Management & Systems, University of California, pp. 1-16.*

(Continued)

Primary Examiner — Mussa A Shaawat
(74) Attorney, Agent, or Firm — Greenberg Traurig, LLP (57) ABSTRACT

The present invention describes a method comprising of a services business language (SBL) providing a common interface for communication with one or more multiple providers in one or more vertical segments. In one embodiment, the vertical segments comprise one or more of package shipping, courier services, flights, hotels, rental cars, and dry cleaners. In another embodiment, the SBL documents of the SBL are defined by Universal Business Language (UBL). In one embodiment, the SBL document includes multiple namespaces that are used in documents as element types and attribute types.

15 Claims, 7 Drawing Sheets

U.S. PATENT DOCUMENTS

| | | | |
|---|---|---|---|
| 2004/0249250 A1* | 12/2004 | McGee et al. | 600/300 |
| 2005/0033613 A1 | 2/2005 | Patullo et al. | |
| 2005/0138187 A1 | 6/2005 | Breiter et al. | |
| 2005/0143064 A1 | 6/2005 | Pines et al. | |
| 2005/0254440 A1 | 11/2005 | Sorrell | |
| 2006/0004623 A1 | 1/2006 | Jasti | |
| 2006/0149655 A1 | 7/2006 | Leahy et al. | |
| 2006/0235754 A1 | 10/2006 | Walker et al. | |

OTHER PUBLICATIONS

"Trip.com Takes Off as Cendant-Affiliant Re-Launches Full-Service Leisure Travel Web Site With $40-Plus Million Ad Campaign," PR Newswire, Apr. 29, 2002.

Windley, Philip J., "Web Services Get VAN Boost," InfoWorld, vol. 26, No. 2, pp. 34-35, Jan. 12, 2004.

* cited by examiner

SUPPLIER INTEGRATION WITH SERVICES BUSINESS LANGUAGE

FIELD OF THE INVENTION

This invention relates generally to procurement of services, and more particularly to improving and standardizing the integration of suppliers to the booking process.

BACKGROUND OF THE INVENTION

Many business-to-business (B2B) vendors claim to be "Web Services Enabled" because they accept extended markup language (XML) messages packaged inside Simple Object Access Protocol (SOAP) messages sent over HTTP. They might even expose a Web Services Description Language (WSDL) interface to their partners. Companies that accomplish these practices have taken a step toward becoming web services shops, but have not fulfilled the potential of web services interoperability.

What is clearly needed is a language that is powerful enough to communicate business documents and versatile enough for trading partners to rapidly integrate with their own systems, so that trading partners can agree on the meaning of the messages they exchange to conduct business, not only just their method of exchange.

SUMMARY OF THE INVENTION

The present invention describes a method comprising of a services business language (SBL) providing a common interface for communication with one or more multiple providers in one or more vertical segments. In one embodiment, the vertical segments comprise one or more of package shipping, courier services, flights, hotels, rental cars, and dry cleaners. In another embodiment, the SBL documents of the SBL are defined by Universal Business Language (UBL). In one embodiment, the SBL document includes multiple namespaces that are used in documents as element types and attribute types.

DETAILED DESCRIPTION OF THE INVENTION

Figure 1:
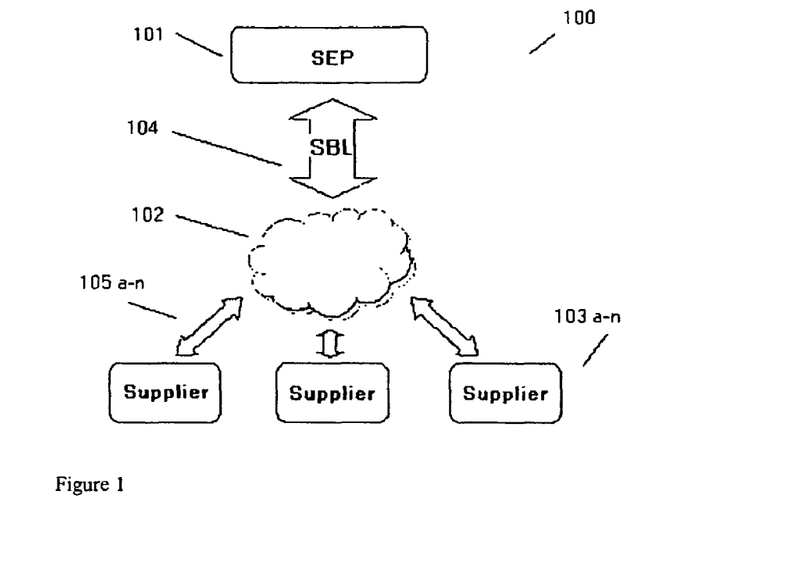
FIG. 1 shows an exemplary simplified architectural overview of how various participants, namely a services exchange provider and suppliers; use a novel services business language disclosed herein.

FIG. 1 shows an exemplary simplified architectural overview 100 of how various participants, namely a services exchange provider (SEP) 101 (U.S. patent application Ser. No. 10/960,408, entitled, "SYSTEM FOR IMPROVING CUSTOMER SATISFACTION IN BOOKING PROCESS," filed Oct. 6, 2004 and is incorporated herein by reference) and suppliers 103 $a$-$n$, use a novel services business language (SBL) 104 disclosed herein. That SBL may be used to electronically procure employee business services from suppliers 103 $a$-$n$ on behalf of customers of SEP 101. The SBL documents defined for each supplier define a common interface 102 for communicating with any provider in one or more vertical segments (or markets), for example, including but not limited to, package shipping (courier services), flights, hotels, rental cars, dry cleaners, etc. The designs of SBL documents harmonize multiple provider interfaces 105 $a$-$n$ into a single interface 102 that exposes the features that any provider might offer. Thus new suppliers can be added in a single supported vertical segment without any changes to SBL.

Figure 2:
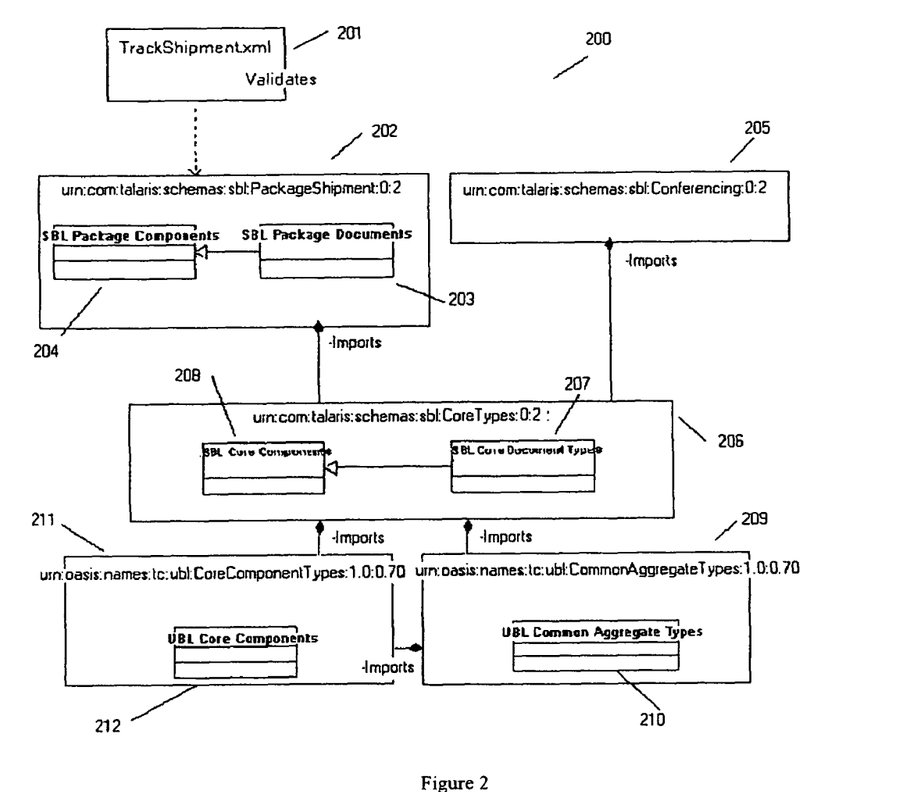
FIG. 2 shows an overview of the architecture of SBL

FIG. 2 shows an overview of the architecture 200 of SBL. The six SBL namespaces 201, 202, 205, 206, 209, and 211 are each a collection of names, identified by a reference, that are used in documents as element types and attribute names. Within namespaces 202, 206, 209, and 211 are XML schema files 203, 204, 207, 208, 210, and 212. An XML schemas definition (XSD) namespace may consist of more than one file if one file includes the contents of another file using the <xsd: include> instruction. The arrows connecting the XSD files denote inclusion, and each box contains the URN of the namespace it represents. The namespaces form a hierarchy, as each imports the contents of the namespaces below it.

SBL documents are built using business information components and data types defined by the Universal Business Language (UBL). UBL provides standard definitions for business information components, such as Party and Address, which are relevant to all types of business transactions. UBL also defines standard representations for critical data types, such as Quantity, Amount, and Measure. Namespaces 209 and 211 are the UBL Core Component Types and Common Aggregate Types. Schema 212 defines data primitives such as ValueType, MeasureType, TextType, etc. Schema 210 defines aggregate components such as PartyType and AddressType. These two schemas contain types that are the basis for all the SBL components in both the core and vertical schemas. In many cases the UBL components are aggregated together to form larger SBL components, and in other cases the UBL components are extended with additional data elements.

Namespace 206 is the SBL core namespace. Schema 208 defines core SBL components, and schema 207 defines the SBL core documents. The documents and components defined in the SBL core namespace are de-contextualized, meaning that they are still horizontal representations of the document or entity they represent, and do not contain any vertical specific information.

The SBL core components schema 208 defines large aggregate components such as Service and Quote, some intermediate-sized ones such as Recurrence, Scheduling, and BillingInformation, and small components such as Price or Reminder. These components are aggregated together to form the core documents, or are extended by the vertical schemas with elements that make them contextualized for the vertical.

Figure 3:
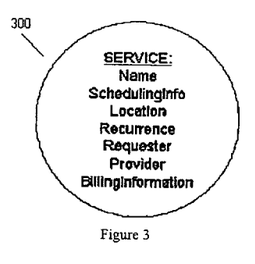
FIG. 3 shows a context-free Service component as defined by the SBL core.

FIG. 3 shows a context-free Service component 300 as defined by the SBL core. Only core SBL definitions of Service are shown here, and in this example they contain information about time and actors, but nothing about the service being requested. This is because the SBL core Service is never used directly in an instance document. The vertical schemas extend Service with vertical specific content of a specific vertical segment, and add the extended elements used in those vertical segments, as further discussed below in more detail, particularly in FIG. 5.

The core documents define the types of service procurement documents that SBL may contain. The core documents are abstract—they are essentially "base documents" that may be extended as needed in vertical schema libraries to create documents that can be used for service procurement transactions.

The scope of the core documents covers a comprehensive set of activities performed during the services procurement process. Much as a set of common activities surround goods procurement—Order, Change Order, Get Quote, Invoice—a similar set of activities surrounds services procurement. Each core document type embodies one of the core activities, which may include the activities listed in the following table:

| | |
|---|---|
| Purchase Service | Reserve Service |
| Modify Service | Cancel Service |
| Get Service Quote | Get Service Details |
| Check Service Status | Get Service Availability |
| Get Provider Details | Search For Service Provider |

Each activity corresponds to a Request/Response pair of documents. These document types are declared as abstract, so they cannot be used to create an instance of a valid XML document. Like the core Service component, SBL core documents are designed for extension in vertical schemas, and the extended types used to describe instance documents.

Figure 4:
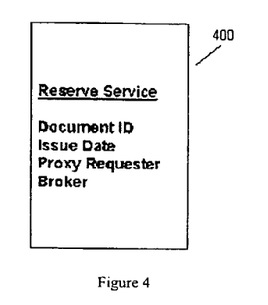
FIG. 4 shows an example context-free Reserve Service document.

FIG. 4 shows an example context-free Reserve Service document 400. The models of PurchaseService and ReserveService are especially sparse, since their content is a contextualized Service element.

The relationship between the SBL core components and documents is different than in other XML vocabularies such as xCBL or UBL. They both aim to be horizontal by covering how most vertical industries will represent common entities such as Item or InvoiceLine. The UBL Order defines a very heavyweight document. It's quite possible that many businesses will be able to use the UBL order as-is, without any extensions. This is one of the goals of UBL. They want their XML Order document to become the electronic equivalent to a standard paper order document small businesses might purchase from an office supply store and use without any modifications. This is a worthwhile goal.

SBL takes a more lightweight approach towards being horizontal. The core documents represent activities, include basic header information like identifiers and date stamps, and in most cases define the actors to the transaction. But the core documents omit definitions for payload elements, since the definition of the payload will depend on the vertical. The core components include general definitions for Service and Quote, but these lack the details to identify them with an actual service, such as a courier pickup or flight. It is up to the vertical schemas to bring everything together and turn an abstract Service into a Pickup, and a ReserveService document into a SchedulePickup. This approach means that the core schemas are less expressive and the vertical schemas more complex, but we contend that the XML instance documents which result from this approach are more expressive and easier to process than instances that are created using a heavyweight core.

Vertical schemas apply context to SBL core components and documents using XSD extension. Context is driven primarily by industry, so there could be contextualized schema libraries for the Package Shipment, Web Conferencing, and Travel, etc., industries. In some cases other contexts, such as geographical area or participatory nature of the service, might be applied as well.

Figure 5:
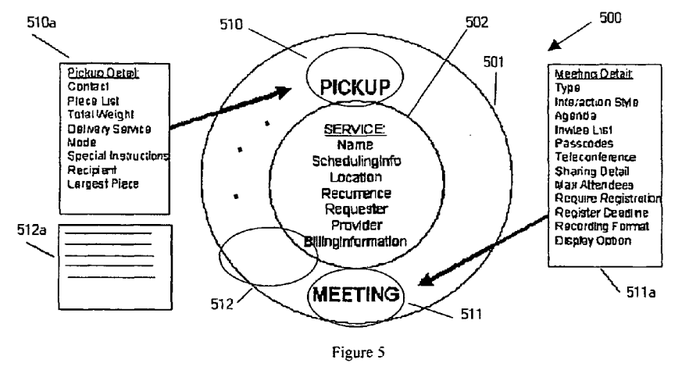
FIG. 5 shows how context is applied to a Service component in overview diagram.

FIG. 5 shows how context is applied to a Service component in overview diagram 500. Inside the SBL sphere 501 is the service component 502 and the vertical extensions (510, 511, 512, etc.), using the industry vertical as the driver. The un-contextualized Service component 502 may be extended, for example, by either PickupDetail 510a or MeetingDetail 511a to define a Package Shipment vertical Pickup component 510 or Conferencing vertical Meeting component 511. It is now clear, that additional verticals can be added, such as 512, etc. (512 could be, for example, for hotels, airlines, etc.).

Figure 6:
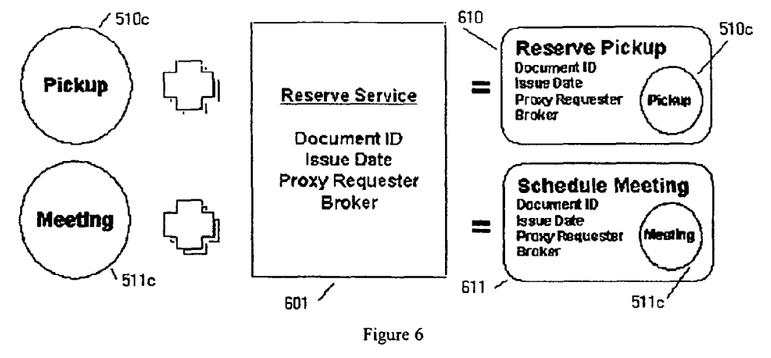
FIG. 6 shows how the ReserveService core document may be extended with a contextualized Service.

Similarly, FIG. 6 shows how the ReserveService core document 601 may be extended with a contextualized Service. The extended document then can to be used in a procurement transaction. This design pattern for defining a sparse core and richer vertical schemas differs from the design pattern embodied in UBL. Thus the looser relationship between the core documents and components results in more expressive instance documents that are both more human readable and easier to program with.

The vertical schemas are designed using document engineering analysis techniques as are well-known to those skilled in the art. Activities supported by a number of provider APIs, paper documents, and electronic forms are associated with activities and core SBL document types. Then an inventory of the data elements in each document is assembled. The following table shows a sample of a spreadsheet modeling one supplier's data requirements for international shipping:

| Element Name | Description | Required | Agg/Leaf | DataType | Example |
|---|---|---|---|---|---|
| ExportLineItem | export line item aggregate | y | agg | | |
| LineNumber | the position of the line (1-200) | y | leaf | number | |
| Quantity | the quantity of the item in this line | y | leaf | number | 55' |
| QuantityUnit | the units used in the quantity | y | leaf | string | units |
| Description | description of the item | y | leaf | string | shirts |
| Value | value of the whole line item | y | leaf | number | |
| IsDomestic | Is the shipment domestic? | n | leaf | boolean | |
| ScheduleB | scheduleB number | n | leaf | string | US Export Code |

Then a harmonized model of the data is constructed by matching together elements that have different names yet are semantically the same, and separating elements with identical names but different meanings. Finally, a matrix that lists all the unique data elements of the harmonized model and indicates which supplier's APIs and documents use that element is constructed, as shown in the sample table below.

| Data Element | Example | Supplier A | Supplier B | Supplier C | Supplier D | SBL |
|---|---|---|---|---|---|---|
| ExportLineItem | | x | x | | | x |
| LineNumber | | x | | | | |
| Quantity | | x | x | x | | x |
| QuantityUnit | | x | | x | | x |
| Description | | x | x | x | | x |
| Value | | x | x | x | | x |
| IsDomestic | | x | | | | |
| ScheduleB | | x | x | x | x | x |

The comparative inventory shows which elements to include in the SBL.

Figure 7:
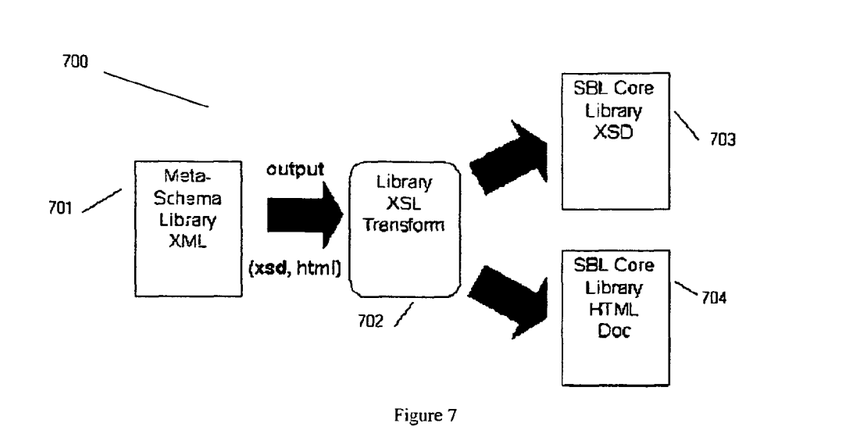
FIG. 7 shows an example of XSD code generation process.

FIG. 7 shows an example of XSD code generation process 700. The canonical representation of the SBL library is not expressed in XSD. SBL uses a meta-schema library 701, written using XML, to express the core and vertical schemas. An XSLT program 702 transforms the meta-schema into an SBL Core Library XSD 703 or SBL Core Library HTML documentation 704.

Attachments A1 through A7 are examples of XSD files generated for the SBL core library XSD 703.

It is clear that many modifications and variations of this embodiment may be made by one skilled in the art without departing from the spirit of the novel art of this disclosure.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in them selves recite only those features regarded as essential to the invention.

What is claimed is:

1. A computer implemented method comprising:
   using, via a computing device, a services business language (SBL), to provide a common interface for communication with one or more multiple providers in one or more vertical segments, wherein SBL documents of the SBL are defined by Universal Business Language (UBL), wherein the vertical segments include at least one of hotels and dry cleaners;
   including in an SBL document a plurality of core type namespaces wherein each namespace comprises at least one of a schema that defines its core components and core documents, wherein the core documents and core components defined in each core type namespace are de-contextualized to be horizontal, wherein the core components in each core type namespace are categorized into a plurality of sizes and are aggregated together to form the core documents, the core components in the core type namespace defining components including both recurrence and reminder;
   selectively extending the core components according to a vertical schema indicative of a specific industry;
   selectively extending the core documents according to the vertical schema indicative of the specific industry;
   using a meta-schema library, written using XML, to express core and vertical schemas in XSD code generation; and
   transforming meta-schema into an SBL core library XSD or SBL core library HTML documentation;
   wherein the core documents omit definitions for payload elements, and a definition of the payload elements is dependent on the vertical schemas.

2. The method of claim 1, wherein the vertical segments are one or more members selected from the group consisting of package shipping, courier services, flights, and rental cars.

3. The method of claim 2, wherein an SBL document includes multiple namespaces that are used in documents as element types and attribute types.

4. The method of claim 3, wherein the SBL document comprises a core component type namespace and a core component common aggregate type.

5. The method of claim 4, wherein the core component type namespace comprises schema defining at least one selected from the group consisting of a valueType, measuretype, texttype.

6. The method of claim 4, wherein the core component common aggregate namespace comprises schema defining at least one of a partytype and addresstype.

7. The method of claim 3, wherein the namespaces comprise of one or more schema definitions, wherein one schema definition includes contents of another schema definition.

8. The method of claim 1, wherein documents and components defined in the core type namespace are verticalized for the travel industry.

9. The method of claim 1, wherein the core components of the core type namespace, defines components that are one or more members selected from the group consisting of service, quote, scheduling, billing information, and price.

10. The method of claim 4, wherein core SBL definitions of a Service component are one or more members selected from the group consisting of name, scheduling, location, recurrence, requester, provider, and billing information.

11. The method of claim 10, wherein core document types are one or more members selected from the group consisting of purchase service, reserve service, modify service, cancel service, get service quote, get service details, check service status, get service availability, get provider details, and search for service provider.

12. A machine readable non-transitory medium having stored thereon a set of instructions, which when executed on a computing device, cause the computing device to perform a method comprising:
   using services business language (SBL) to provide a common interface for communication with one or more multiple providers in one or more vertical segments, wherein SBL documents of the SBL are defined by Universal Business Language (UBL), wherein the vertical segments include at least one of hotels and dry cleaners;
   including in an SBL document a plurality of core type namespaces wherein each namespace comprises at least one of a schema that defines its core components and core documents, wherein the core documents and core components defined in each core type namespace are de-contextualized to be horizontal, wherein the core components in each core type namespace are categorized into a plurality of sizes and are aggregated together to form the core documents, the core components in the core type namespace defining components including both recurrence and reminder;
   selectively extending the core components according to a vertical schema indicative of a specific industry;
   selectively extending the core documents according to the vertical schema indicative of the specific industry;

using a meta-schema library, written using XML, to express core and vertical schemas in XSD code generation; and transforming meta-schema into an SBL core library XSD or SBL core library HTML documentation;

wherein the core documents omit definitions for payload elements, and a definition of the payload elements is dependent on the vertical schemas.

13. The machine readable medium of claim 12, wherein core documents omit definitions for payload elements, and the definition of payload elements is dependent on vertical schemas.

14. A computer system comprising:

at least one server for:

using services business language (SBL) means to provide a common interface for communication with one or more multiple providers in one or more vertical segments, wherein SBL documents of the SBL are defined by Universal Business Language (UBL), wherein the vertical segments include at least one of hotels and dry cleaners;

including in an SBL document a plurality of core type namespaces wherein each namespace comprises at least one of a schema that defines its core components and core documents, wherein the core documents and core components defined in each core type namespace are de-contextualized to be horizontal, wherein the core components in each core type namespace are categorized into a plurality of sizes and are aggregated together to form the core documents, the core components in the core type namespace defining components including both recurrence and reminder;

selectively extending the core components according to a vertical schema indicative of a specific industry;

selectively extending the core documents according to the vertical schema indicative of the specific industry;

using a meta-schema library, written using XML, to express core and vertical schemas in XSD code generation; and transforming meta-schema into an SBL core library XSD or SBL core library HTML documentation;

wherein the core documents omit definitions for payload elements, and a definition of the payload elements is dependent on the vertical schemas.

15. The computer system of claim 14, wherein core documents and components are verticalized for the travel industry.

\* \* \* \* \*